United States Patent [19]

Inamiya

[11] Patent Number: 5,206,466
[45] Date of Patent: Apr. 27, 1993

[54] DIAPHRAGM FOR SPEAKER

[75] Inventor: Tatsuya Inamiya, Tokyo, Japan

[73] Assignee: Sansui Electric Co., Ltd., Tokyo, Japan

[21] Appl. No.: 671,955

[22] Filed: Mar. 19, 1991

[30] Foreign Application Priority Data

Apr. 13, 1990 [JP] Japan .................... 2-98514
Nov. 29, 1990 [JP] Japan .................... 2-331147

[51] Int. Cl.$^5$ .................................. G10K 13/00
[52] U.S. Cl. .................................. 181/169; 181/170
[58] Field of Search ........... 181/163, 167, 169, 170; 428/64, 65, 66; 381/162, 204

[56] References Cited

U.S. PATENT DOCUMENTS 3,935,924  2/1976  Nagao et al. ................ 181/169
4,377,617  3/1983  Ikei et al. ................... 181/167 X

FOREIGN PATENT DOCUMENTS 0215292  9/1988  Japan ........................ 181/167

Primary Examiner—Michael L. Gellner
Assistant Examiner—Khanh Dang
Attorney, Agent, or Firm—Morrison Law Firm

[57] ABSTRACT

A speaker diaphragm includes a combined fiber paper made with crushed silk chips and a crushed bast fiber. In the preferred embodiment, the bast fiber is a natural Manila hemp fiber. The silk fiber contributes vibration damping to the diaphragm while the bast fiber contributes strength and stiffness. The crushed silk chips and the crushed bast are mixed with water to produce a slurry from which the water is drained to produce the combined fiber paper. In a further embodiment of the invention, a layer of a different material is disposed between two layers of the combined filter paper. The layer of different material is selected from a hard wound silk gauze, a glass fiber, a polyamid fiber and a carbon fiber.

5 Claims, 2 Drawing Sheets

DIAPHRAGM FOR SPEAKER

BACKGROUND OF THE INVENTION

1. Field of the Invention

The present invention relates to a diaphragm used for a speaker.

2. Description of the Prior Art

In order to reproduce the original sound accurately, it is essential that a diaphragm for a speaker repeat piston motions with its entire surface in the same phase without being distorted or deformed. It is well known that light (low density $\rho$) diaphragms with high rigidity (high Young's modulus E) are better for this purpose. In other words, the higher the velocity of sound propagation $(E/\rho)^{0.5}$, the better. It is also known that internal losses in appropriate amounts produce better results.

A recent example of a diaphragm, which has as its objective increasing $(E/\rho)^{0.5}$, as mentioned above, uses high-rigidity carbon fiber or the like.

Although diaphragms such as described above are able to prevent large deflections, their rigidity is higher and the Q factor at their resonance point is sharper. Therefore, they present a problem in that their frequency characteristics are not flat. They peak in the middle to high frequency range.

Furthermore, the sound of secondary radiation of the normal mode, caused by resonant vibration of the material, dulls the reproduced sound, thus making it impossible to reproduce clear sound.

As described above, while conventional speaker diaphragms using carbon fiber with high rigidity or similar materials have excellent rigidity, they present difficulties in restraining resonance of the material, and thus are unable to achieve the desired characteristics.

OBJECTS AND SUMMARY OF THE INVENTION

In order to solve the above problem, it is an object of the present invention to provide a speaker diaphragm that has superior characteristics and is capable of accurate sound radiation of electrical music signals.

It is a still further object of the invention to provide a speaker diaphragm having improved damping characteristics.

It is a still further object of the invention to provide a speaker diaphragm that incorporates the desirable properties of a bast fiber and a silk fiber.

It is a still further object of the invention to provide a material for a speaker diaphragm that is lighter in weight than conventional materials, whereby a diaphragm of the same weight can be made thicker, and thus can be capable of greater damping of resonant vibration.

Briefly stated, the present invention provides a speaker diaphragm that includes a combined fiber paper made with crushed silk chips and a crushed bast fiber. In the preferred embodiment, the bast fiber is a natural Manila hemp fiber. The silk fiber contributes vibration damping to the diaphragm while the bast fiber contributes strength and stiffness. The crushed silk chips and the crushed bast are mixed with water to produce a slurry from which the water is drained to produce the combined fiber paper. In a further embodiment of the invention, a layer of a different material is disposed between two layers of the combined filter paper. The layer of different material is selected from a hard wound silk gauze, a glass fiber, a polyamid fiber and a carbon fiber.

According to an embodiment of the invention, there is provided a speaker diaphragm comprising: a bast fiber, a silk fiber combined with the bast fiber, the bast fiber having been flaked before being combined with the silk fiber, the silk fiber having been crushed before being combined with the bast fiber, and the bast fiber and the silk fiber forming a combined fiber paper of the diaphragm.

According to a feature of the invention, there is provided a method for producing a paper, comprising: shredding natural silk fibers into fine chips, mixing the fine chips with a flaked bast fiber to produce a pulp, dispersing the pulp into water to form a slurry, and straining the water from the slurry.

According to a further feature of the invention, there is provided a method for producing a loudspeaker diaphragm comprising: shredding natural silk fibers into fine chips, mixing the fine chips with a flaked bast fiber to produce a pulp, dispersing the pulp into water to form a slurry, and straining the water from the slurry to form a paper, and forming the paper into the diaphragm.

According to a still further feature of the invention, there is provided a speaker diaphragm comprising: at least one sheet of a silk gauze, at least a first sheet of a combined fiber paper affixed to a first surface of the silk gauze, at least a second sheet of the combined fiber paper affixed to a second opposed surface of the silk gauze, and the combined fiber paper being a mixture of chips of a silk fiber and flakes of a bast fiber.

According to another feature of the invention, there is provided a speaker diaphragm comprising: at least one sheet of a silk gauze, at least a first sheet of a combined fiber paper affixed to a first surface of the silk gauze, at least a second sheet of the combined fiber paper affixed to a second opposed surface of the silk gauze, and the combined fiber paper being a mixture of chips of a silk fiber and a bast fiber.

According to still another feature of the invention, there is provided a speaker diaphragm comprising: at least one sheet of a material, the material being one of a hard twisted silk gauze, a glass fiber, a polyamid fiber, or a carbon fiber, at least a first sheet of a combined fiber paper affixed to a first surface of the sheet of material, at least a second sheet of the combined fiber paper affixed to a second opposed surface of the sheet of material, and the combined fiber paper being a mixture of chips of a silk fiber and a bast fiber.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
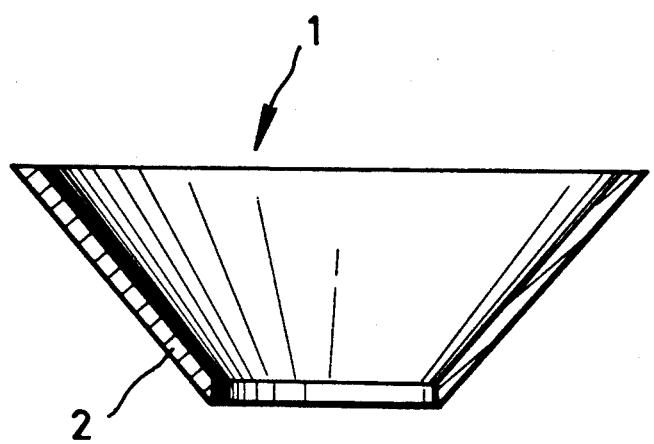
FIG. 1 is a cross section of a speaker diaphragm according to an embodiment of the present invention.

Referring to FIG. 1, a speaker diaphragm 1 is made of a combined fiber paper 2 formed into a specified cone shape.

Combined fiber paper 2 is produced according to the following procedure:

A natural silk fiber is shredded into fine chips and then crushed into even finer pieces of several microns. The crushed pieces are mixed with fiber of finely flaked bast fiber, preferably, natural Manila hemp, in the ratio of about 7:3 to make a pulp. This pulp of silk and hemp is made into a slurry by dispersal in water and then made into paper by straining the water through a fine mesh. In the finished product, fibers of silk and hemp are interwoven and organically bonded together.

The term bast fibers, are generally defined as strong ligneous fibers including flax, hemp, ramie and jute. Although a combined fiber paper 2 containing hemp is the preferred embodiment of the invention, other types of bast fibers may be substituted therefor without departing from the spirit and scope of the invention.

The explanation of characteristics of silk fiber is given hereunder:

Having animal protein fibroin as its principal element, silk is quite different from cellulose, which comprises vegetable fibers conventionally used for cone paper.

For example, when beaten or rubbed, conventional materials make rustling noises, but silk does not make such disagreeable noises.

The above difference can be described in physical terms. The critical elongation percentage and the tensile strength of cellulose are 1.9–3.9% and 4.9–6.4 gram-weight/denier respectively. Silk has almost seven times as much critical elongation percentage, 20–23% but has a weaker tensile strength of 3.6–4.1 gram-weight/denier.

Silk is structured with a fibliform protein named fibroin enveloped by a protein film called sericin. As the above proteins consist of amino acid, such as glycine, alanine and serine, the structure of silk fiber is very much simpler than other natural fibers, having a smooth fiber surface in the lengthwise direction and polypeptide chains with long orderly crystals in the axial direction of the fiber.

As explained above, silk fiber is very much softer and more supple than cellulose, and these "supple" and "light" characteristics of silk work effectively when used as the principal material for a speaker diaphragm.

As a mechanical material silk is weak, which is explained hereinabove. A material made of 100% silk is too weak to be put to practical use as a speaker diaphragm. Therefore, for the present embodiment, silk is combined in a mixture containing 30% Manila hemp to ensure rigidity of the finished speaker diaphragm 1. Manilla hemp is a hard fiber made from monocotyledonous vascular bundles and conventionally used as the secondary material for cone paper.

In combined fiber paper 2 described above, fibroin alone is extracted from the silk fiber by crushing, as mentioned above, and split into fine, long protein chains which are thinner and more supple than a single fiber. Thus the silk, with a fiber diameter of 10–15 microns, which is similar to that of a single fiber of hemp, is reduced to a diameter of 0.3–2.0 microns.

The silk clings to the hemp when the paper is made, thereby filling the spaces between the fibers of hemp, and forming combined fiber paper 2.

The speaker diaphragm 1, made of this combined fiber paper 2, exhibits the excellent damping characteristics of soft, elastic silk fiber, together with the highly rigid characteristics of hard, marginally elastic hemp fiber. Each component material supplies characteristics that the other lacks. Silk dampens resonant vibration of hemp, and hemp provides the mechanical strength that silk lacks.

Combined fiber paper 2, made of fibers of silk and hemp, is light (⅓ the weight of a diaphragm using carbon fiber) because of its ingredients and structure. It is therefore possible to make a speaker diaphragm proportionally thicker than others of the same weight that use different materials. This provides greater internal losses and therefore results in improved music quality.

As a result, this speaker diaphragm 1 exhibits superior characteristics as a diaphragm for a speaker and is capable of accurate sound reproduction.

Figure 2:
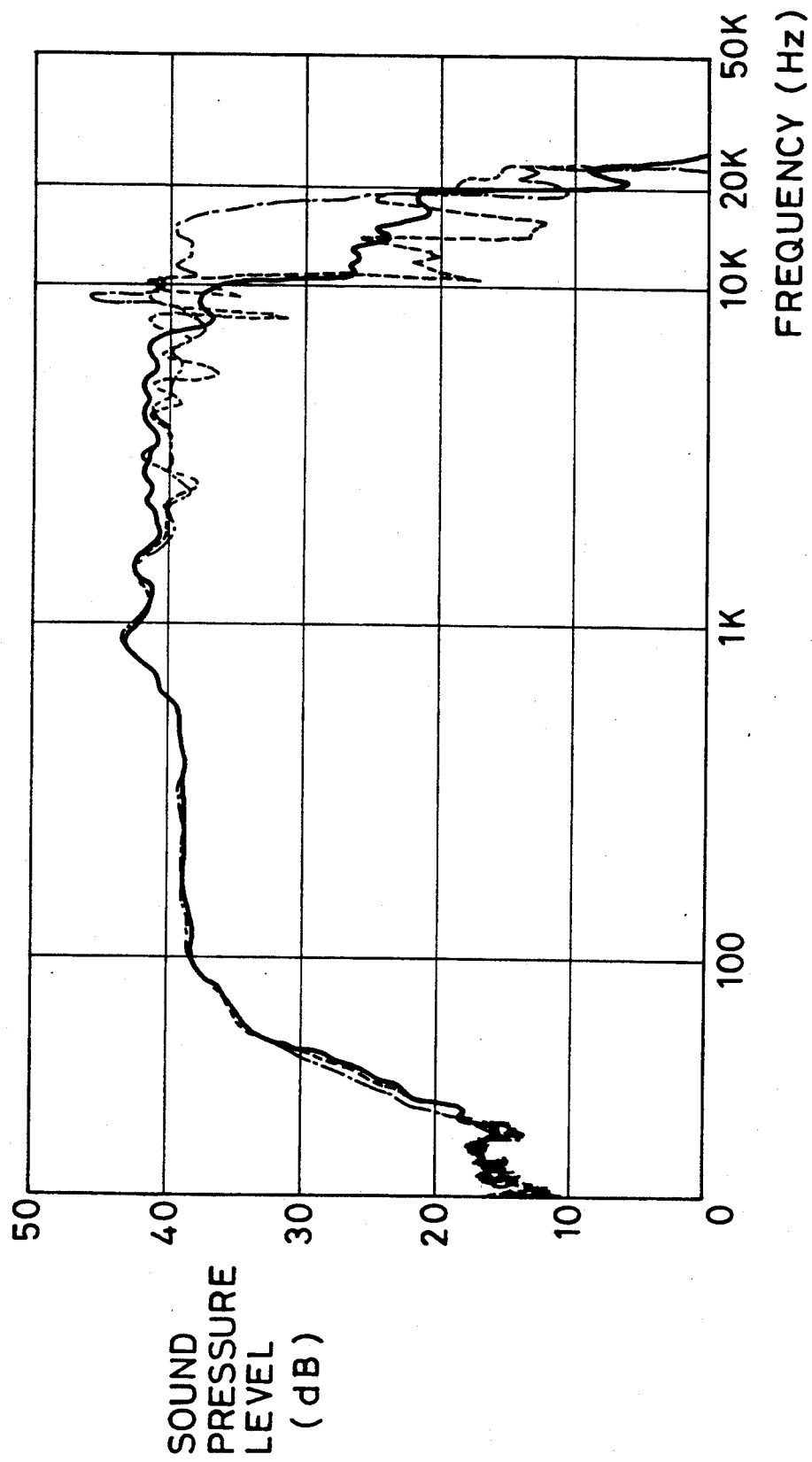
FIG. 2 is a diagram comparing the frequency characteristics of the speaker diaphragm according to the invention with the frequency characteristics of conventional speaker diaphragms.

Three woofer speaker units were compared. A first speaker diaphragm 1 of silk-and-hemp combined fiber paper 2, according to the invention, a second speaker diaphragm of conventional carbon fiber, and a third speaker diaphragm of conventional vegetable fiber were tested. All three diaphragms were given the same shape and weight. The frequency response characteristics were measured, to yield the results shown in FIG. 2.

The vegetable fiber diaphragm, shown as a broken line, produced an extremely uneven response in the 6–10 KHz range and the response is rapidly attenuated beyond 10 KHz. The carbon fiber diaphragm, shown as an alternate long and short dash line, generally reach the high range, but a sharp peak appears in the range of 8 to 9 KHz. The response of the silk-and-hemp combined fiber paper 2, shown as a solid line, is flatter than the other two, especially in the range of 1–5 KHz, and gradually attenuates with no peak appearing in the high range.

One of the grave concerns with a speaker diaphragm is how the distribution of the vibration modes of secondary radiation, which is the surface radiation of the materials, affects actual sound reproduction. Whereas conventional diaphragms having bonded carbon fiber on the surface dull the reproduced sound, diaphragms according to the present invention only add a delicate, graceful touch characteristic of silk instead of dulling the sound.

Although the fibers of silk and hemp were mixed in the approximate weight ratio of 7:3 in the present embodiment, the ratio may be changed depending on the diameter of a speaker and the frequency range of the sound to be reproduced.

Figure 3:
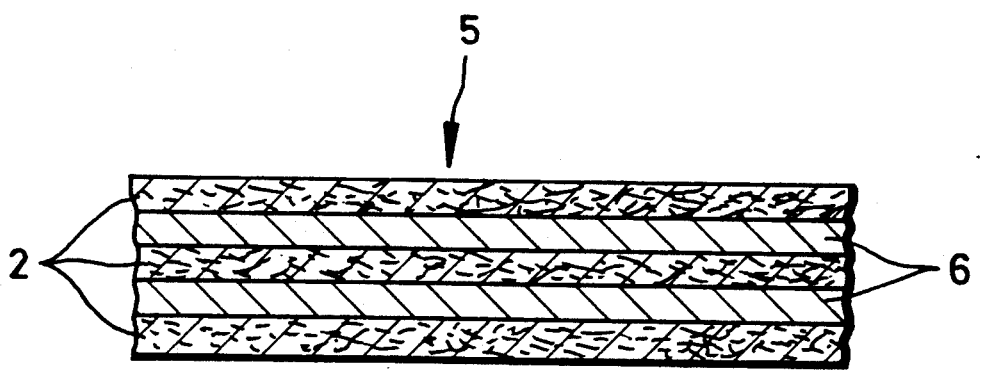
FIG. 3 is a cross section of a part of a speaker diaphragm according to a second embodiment of the invention.

Referring now to FIG. 3, a speaker diaphragm 5 consists of alternate layers of combined fiber paper 2 made of silk and hemp fibers and a gauze 6. A total of five layers thus stacked are bonded together by saturating them with synthetic resin and then formed into a specified cone shape.

Combined fiber paper 2 is the same combined fiber paper used for speaker diaphragm 1 of the first embodiment described above. Gauze 6 is made of thin, hard twisted threads of natural silk woven into a fine mesh. Each side of gauze 6 is bonded to a sheet of combined fiber paper 2 containing the same silk fiber.

The production process of speaker diaphragm 5 calls for press molding combined fiber paper 2; press molding gauze 6 on the molded combined fiber paper 2, sticking the combined fiber paper 2 and gauze 6 together at the same time; and alternating a layer of combined fiber paper 2 with a layer of gauze 6 until a total of five layers are achieved, all of which are bonded together.

Because of the configuration described above, the fibers of silk and hemp are interwoven and organically bonded together in each of the three layers of combined fiber paper 2 of speaker diaphragm 5, which are respectively located on the surface of the inner and outer sides and the middle of the diaphragm. Therefore, the excellent damping characteristics of soft, elastic silk fiber and the highly rigid characteristics of hard, marginally elastic hemp are exhibited to the full extent, each providing characteristics that the other lacks and restraining each other's vibration mode. As a result, it is possible to suppress resonance effectively.

Furthermore, the two layers of gauze 6, respectively sandwiched between three layers of combined fiber paper 2 and consisting of hard twisted silk fiber, prevent large deflections, strengthen the structure of the diaphragm and enlarge the range of piston motion.

Consequently, the present speaker diaphragm 5 exhibits superior characteristics as a speaker diaphragm and is capable of accurate reproduction of electrical signals of music.

The synthetic resin used to stick combined fiber paper 2 to gauze 6 may be selected from any convenient known product. The selection of such a synthetic resin would be fully within the knowledge of one skilled in the art.

Further, the structure of speaker diaphragm 5 is not limited to a five-layer structure which is used for the present embodiment. It may have, for example, a three-layer structure consisting of two layers of combined fiber paper 2 sandwiching one layer of gauze 6.

Furthermore, a polypropylene sheet or a fabric made from glass fiber, polyamid fiber or carbon fiber, may be substituted for gauze 6 made of silk fiber. In that case, the same function and effects as that of speaker diaphragm 5 described above can be obtained, because such a sheet or fabric has characteristics similar to those of gauze 6 made of silk fiber.

As explained above, the fibers of silk and hemp of the combined fiber paper of a speaker diaphragm according to the present invention are organically interwoven. For this reason, the good damping characteristics of the soft, elastic silk fiber and the highly rigid characteristics of the hard, marginally elastic hemp are exhibited to the full extent, each covering what the other lacks and restraining each other's vibration mode. Consequently, it is possible to effectively suppress resonance. Since the ingredients and structure of the combined fiber paper make it light, it is possible to make a speaker diaphragm thicker than those with the same weight made with conventional materials. This means greater internal loss and therefore results in more favorable reproduction of music.

Consequently, speaker diaphragms according to the present invention exhibit superior characteristics and are capable of accurate reproduction of electrical signals of sound. As the silk, which is a fiber with especially desirable characteristics, causes resonance to be effectively dispersed, thereby producing high damping effect, it is possible to obtain softer and more natural sound reproduction.

In addition to the effect of the combined fiber paper made of fibers of silk and hemp, layered speaker diaphragms according to FIG. 3 of the present invention have other advantageous characteristics. Sandwiching the hard twisted silk fibers of the gauze between the layers of combined fiber paper prevents large deflections, strengthens the structure of the diaphragm and enlarges the range of piston motion.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A speaker diaphragm comprising:
  a bast fiber;
  a silk fiber combined with said bast fiber;
  said bast fiber having been flaked before being combined with said silk fiber;
  said silk fiber having been crushed before being combined with said bast fiber;
  said silk fiber includes a fiber diameter of less than 10 microns; and
  said bast fiber and said silk fiber forming a combined fiber paper of said diaphragm.

2. Apparatus according to claim 1 wherein said fiber diameter is between about 0.3 and 2.0 microns.

3. A speaker diaphragm comprising:
  at least one sheet of a silk gauze;
  at least a first sheet of a combined fiber paper affixed to a first surface of said silk gauze;
  at least a second sheet of said combined fiber paper affixed to a second opposed surface of said silk gauze; and
  said combined fiber paper being a mixture of chips of a silk fiber and a bast fiber.

4. A speaker diaphragm according to claim 3, wherein said speaker diaphragm includes at least two sheets of said silk gauze.

5. A speaker diaphragm comprising:
  at least one sheet of a material;
  said material being one of a hard twisted silk gauze, a glass fiber, a polyamid fiber, or a carbon fiber;
  at least a first sheet of a combined fiber paper affixed to a first surface of said sheet of material;
  at least a second sheet of said combined fiber paper affixed to a second opposed surface of said sheet of material; and
  said combined fiber paper being a mixture of chips of a silk fiber and a bast fiber.

* * * * *